United States Patent
Denes

[15] 3,638,144
[45] Jan. 25, 1972

[54] BROADBAND LOW-PASS FILTER

[72] Inventor: Peter A. Denes, 9101 Crestwood Ave. N.E., Albuquerque, N. Mex. 87112

[22] Filed: Nov. 6, 1969

[21] Appl. No.: 874,636

Related U.S. Application Data

[63] Continuation-in-part of Ser. No. 730,352, May 20, 1968.

[52] U.S. Cl. ................................. 333/79, 317/242, 317/258
[51] Int. Cl. ......................................................... H03h 7/14
[58] Field of Search ........................ 333/70, 79, 81; 178/45; 317/243, 242, 258

[56] References Cited

UNITED STATES PATENTS

| | | | |
|---|---|---|---|
| 3,035,237 | 5/1962 | Schlicke | 333/79 |
| 3,023,383 | 2/1962 | Schlicke | 333/79 |
| 3,289,118 | 11/1966 | Garstang | 333/79 |
| 3,541,478 | 11/1970 | Peterson et al. | 333/79 |
| 3,521,200 | 7/1970 | Matushima et al. | 333/79 |
| 3,320,557 | 5/1967 | Garstang | 333/79 |
| 3,243,738 | 3/1966 | Schlicke | 333/79 |
| 3,456,215 | 7/1969 | Denes | 333/79 |

FOREIGN PATENTS OR APPLICATIONS

| | | | |
|---|---|---|---|
| 893,398 | 6/1964 | France | 333/79 |

*Primary Examiner*—Herman Karl Saalbach
*Assistant Examiner*—C. Baraff
*Attorney*—Spensley and Horn

[57] ABSTRACT

Broadband low-pass filters containing inductors and/or capacitors wherein resonances of a main inductor and/or capacitor are obviated by utilizing single-turn inductors and/or low distributed inductance capacitors which have no self resonances below 200 MHz. and whose resonances do not coincide with the self resonances of the main components. The auxiliary components are connected so as to maintain the high-insertion loss of the filter at the self-resonant frequencies of the main components.

1 Claims, 18 Drawing Figures

PATENTED JAN 25 1972

PETER A. DENES
INVENTOR.

BY Spensley & Horn
ATTORNEYS

PETER A. DENES
INVENTOR.

BY Spensley & Horn
ATTORNEYS

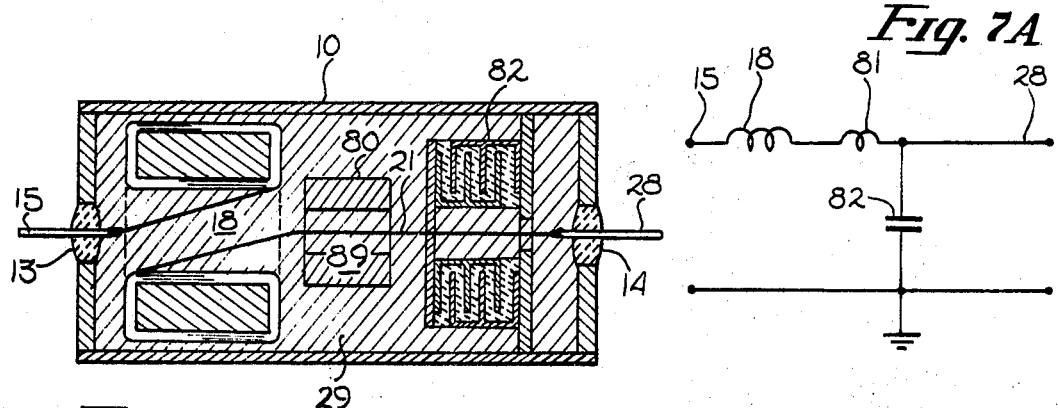
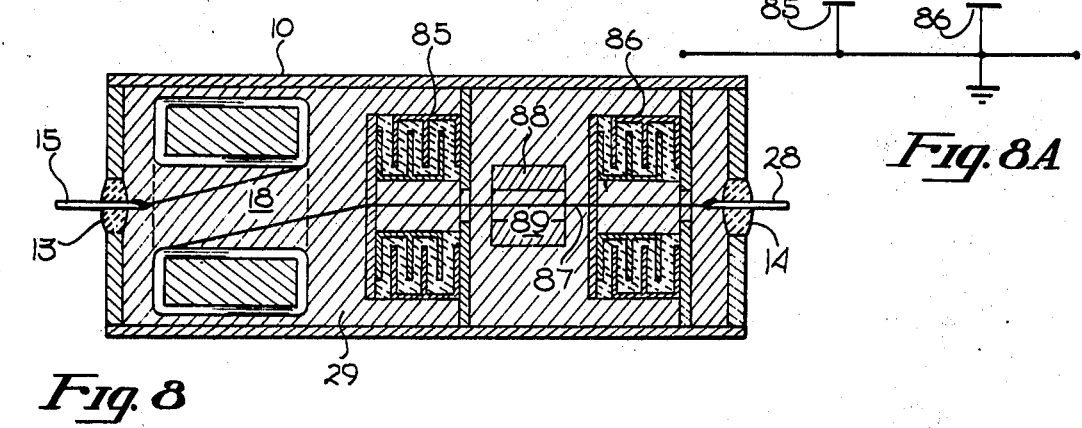
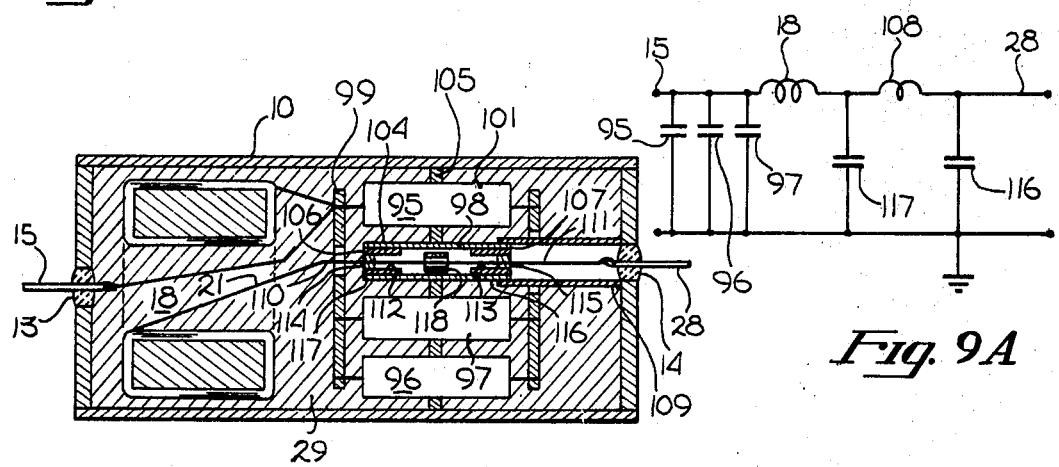

3,638,144

BROADBAND LOW-PASS FILTER

REFERENCES TO RELATED APPLICATIONS

This application is a continuation-in-part of my application Ser. No. 730,352 filed May 20, 1968.

BACKGROUND OF THE INVENTION

1. Field of the Invention

This invention relates to broadband high-frequency low-pass filters and more particularly to those whose stop bands extend to the frequencies of self resonance of the inductive and/or capacitive components of the filter.

2. Prior Art

High-frequency low-pass filters having a usable attenuation in the hundred kilohertz ranges are known in the art. Such filters had an L- or reversed L-, Pi-, T-section or multiple sections of the mentioned types, and had one or more wound inductors. As the maximum frequency range for which they were needed was relatively low (e.g., 30 MHz.) they worked satisfactorily, in spite of the fact that the parallel capacitance of the wound inductor and the inductance of the wound paper or plastic capacitors generally used caused resonances in those components. The chance, however, that these resonances would all coincide, was small within the limited frequency range of interest. Today, when the frequency range is extended to much higher limits, e.g., up to 10 GHz., such components have so many resonances that the probability of coincidences becomes quite high. The curve of attenuation versus frequency of such filters is generally full of resonance ringings. It is difficult to calculate how low the attenuation will dip at certain frequencies but it may drop to values as low as 20 or 10 db. The actual values depend on the lossiness of the resonating components at the resonance frequencies. As the lossiness grows with frequency, the higher order harmonic resonances exhibit smaller drops in attenuation.

The present application teaches the use of components, basically resonance free or at least having resonances not coincidental with the resonances of the main section which provides the impedance necessary to counteract the attenuation dips due to resonances in the main components. Thus, the present invention extends the range of usable attenuation from the hundred kiloherz range of the prior art to the gigaHertz range.

By employing these additional components in the filter, a safe minimum attenuation as high as 100 db., for example, can be maintained in miniature filters, up to frequencies in excess of 20 GHz.

The simplest, but not the most effective deresonation, can be achieved in the capacitors themselves. Although in principle any type of dielectric material can be used, I will describe the invention using ceramic dielectrics which is a preferred embodiment due to the desirable high dielectric constants obtainable.

Much more effective deresonation can be secured by also employing a one turn inductor among the deresonating means. If an inductor has only one turn, the throughgoing terminal, and if the magnetic material has high losses, this inductor has hardly any dangerous resonance effects at all. The material of the inductor may be a ferromagnetic or ferrimagnetic material, its permeability should be greater than about 2 at 1 MHz., and its quality factor, Q, should be less than about 10 at 10 MHz., and less than about 5 at 200 MHz.

In a simple design, such an inductor can be applied in series with the main wound inductor before the main capacitor. More effective deresonation is obtainable if the inductor is placed between sections of the main capacitor. Further details will be discussed in the detailed description of the preferred embodiments.

SUMMARY OF THE INVENTION

The present invention is directed to a low-pass broadband wave filter wherein auxiliary reactive elements are used which do not have resonances which coincide with the resonances of the main elements. The auxiliary elements maintain the required filter arm impedance level at the frequencies of resonance of the main elements so that so-called resonance "suck outs" do not occur.

Capacitors having different values of distributed inductance and different cavity type resonances are connected in parallel so that at high frequencies at least one of the parallel connected capacitors is not resonant at any given frequency. The impedance of the assembly is thereby maintained at a low value at all high frequencies. A lossy single-turn inductor is used in series with a multiturn inductor so that at high frequencies, where the distributed capacity of the winding causes the multiturn inductor to resonate, the single turn inductor will maintain the inductive arm impedance high and thus allow the filter to retain high insertion loss.

It is the primary object of this invention to provide a low-pass filter whose stop band is free of resonance "suck outs" up to very high frequencies.

The novel features which are believed to be characteristic of the invention, both as to its organization and method of operation, together with further objects and advantages thereof will be better understood from the following drawings in which the presently preferred embodiments of the invention are illustrated by way of example. It is to be expressly understood, however, that the drawing is for the purpose of illustration and description only and is not intended as a definition of the limits of the invention.

BRIEF DESCRIPTION OF THE DRAWINGS

FIG. 7 is a cross-sectional view of another embodiment of the invention in which a single-turn inductor is put in series with the main inductor;

FIG. 7A is a schematic diagram of the embodiment of FIG. 7;

FIG. 8 is a cross-sectional view of another embodiment of the invention including a single-turn inductor between sections of the main capacitor section;

FIG. 8A is a schematic diagram of the embodiment of FIG. 8;

FIG. 9 is a cross-sectional view of another embodiment of the invention in which a reversed L-section main filter is followed by a pi section having a single turn inductor; and, FIG. 9A is a schematic diagram of the embodiment of FIG. 9.

DETAILED DESCRIPTION OF THE PREFERRED EMBODIMENTS

Figure 1:
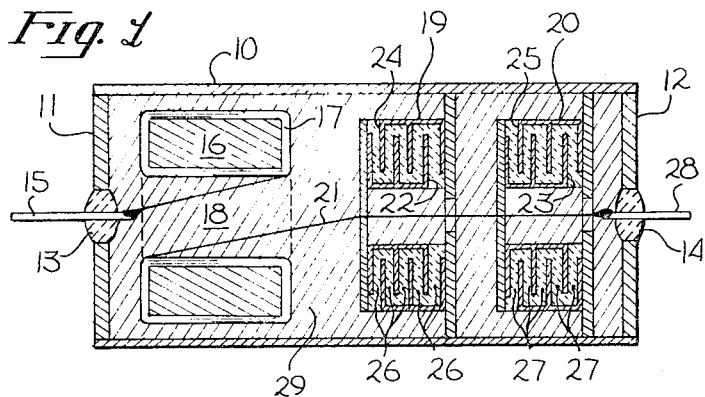
FIG. 1 is a cross-sectional view of one embodiment of the invention which utilizes different dielectric materials as the deresonating means.
Figure 1A:
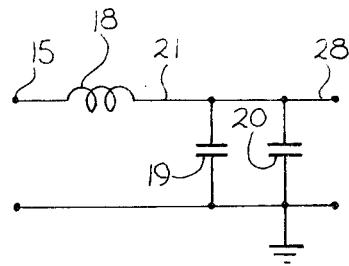
FIG. 1A is a schematic diagram of the embodiment of FIG. 1.

Referring to the drawings and more particularly to FIG. 1, the numeral 10 indicates a metallic tube which serves as a ground and as a housing for the filter. At the ends of housing 10 are metallic end plates 11 and 12 in which glass feed through insulators 13 and 14 are centrally located. The filter input lead 15 passes through insulator 13 and around magnetic core 16 forming a winding 17 having a plurality of turns. The core 16 together with winding 17 forms an inductor indicated by the numeral 18.

Two capacitors 19 and 20 are positioned inside the housing 10. Each capacitor has one set of plates connected to inductor 18 by conductor 21 and a second set of plates directly connected to the housing 10. The capacitor-forming plates are 22 and 24 for capacitor 19, and 23 and 25 for capacitor 20. Between the plates 22 and 24 of capacitor 19, and 23 and 25 of capacitor 20 are dielectric discs 26 and 27. The dielectric is preferably from the class of materials known as "ceramics." Included in the expression "ceramics" is an inorganic solid-state system composed of one or of a number of metal oxides or oxide compounds precipitated in a glass matrix or which latter ones may be even completely amorphous systems if they have dielectric constants higher than about 5. Ceramic may also apply to composite systems of metal oxides and metals, if prepared by the usual methods of making ceramic bodies, such as sintering, hot pressing, etc. Such metal-metal oxide composites may be included as ceramic materials if their dielectric constant is greater than about 5, and if their insulation resistance is greater than 10 ohm cm. thus allowing their use in ceramic capacitors. In this specification the word "ceramic" shall include any and all of the above-mentioned type of materials. The construction of such capacitors is more fully described in my copending application Ser. No. 730,352 filed May 20, 1968.

It should be understood that other dielectric materials may be used in this invention and it is not intended that the invention be limited by the reference to ceramic materials herein. Nonwound, discoidal or tubular capacitors with paper or plastic dielectrics have no self-resonances as usually made up to 20 GHz. However, such capacitors have very low capacitance and are not always sufficiently effective for deresonating purposes. Such shape capacitors made of high dielectric constant ceramics are very effective but the higher dielectric constant lowers the resonance frequency. This is because the "electrical thickness" of high dielectric constant materials can be very large.

The term "electrical thickness" is used to mean the thickness of an air dielectric which would contain the same number of wavelengths of an electric field of given frequency as does the dielectric under consideration. The electrical thickness of high dielectric constant materials such as ceramics is substantially different from their physical thickness. The electrical thickness is proportional to the square root of the dielectric constant and therefore, if, for example, a material with a dielectric constant of 10,000 were being used, its electrical thickness would be 100 times its physical thickness. A capacitor, being two plates separated by a dielectric, will exhibit a cavity resonance at that frequency at which the dielectric has an electrical thickness equal to one-half wavelength. If then a capacitor using a dielectric material having a dielectric constant of 10,000 were made in which the dielectric material was 1 mm. thick, a resonance would occur at a frequency which may be determined using the following formula:

$$\frac{300 \times 10^6}{2t \cdot \sqrt{K}} = f$$

where:
$F$ = frequency (hertz)
$K$ = dielectric constant
$t$ = disc thickness (meters)

substituting a disc thickness, $t$=0.001 meters, and $K$=10,000, $f$ is found to be 1.5 gigaHertz. Such a resonance would be objectionable for many present-day applications.

By making the dielectric constants of discs 26 and 27 different, by use of different materials or compositions, the resonances will occur at different frequencies and one capacitor, at least, will be a low impedance at any frequency within the stop band of the filter. The insertion loss of the filter will thus remain high throughout the stop band. It is preferred that the ratio of dielectric constants not be an integral number, in fact, it is preferred that the smallest integer of which the ratio is a factor be large. For example, if the ratio where 1.67, then a resonance "suck out" might be observed at the frequency which corresponds to the third harmonic of the lowest resonance of one of the capacitors and the fifth harmonic of the resonance of the other capacitor. If the fundamental resonance frequencies of these capacitors was relatively low the coincidental resonance might be within the stop band of the filter. On the other hand, if the ratio of the dielectric constants were 1.29, the first coincidental resonance corresponds to the seventh and ninth harmonics respectively. Such high harmonics are normally weak due to the losses in the capacitor and hence do not significantly affect the operation of the filter, There is a practical limit to this harmonic selection since the resonances are somewhat broad and even though lower harmonic frequencies may not exactly coincide, if they are close some intermediate frequency may excite a resonance in both capacitors.

Figure 2:
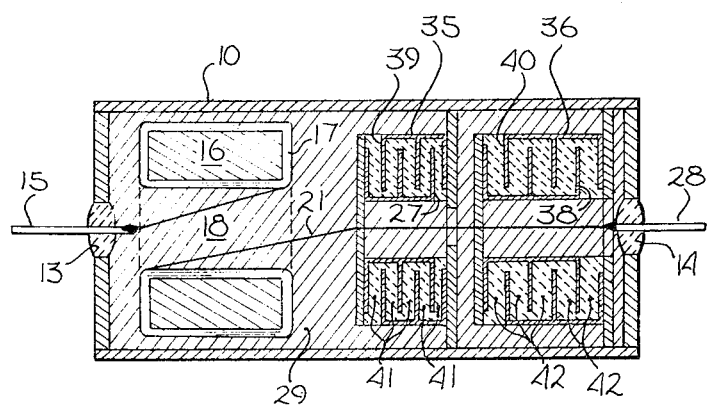
FIG. 2 is a cross-sectional view of another embodiment of the invention which utilizes different thicknesses of dielectric materials as the deresonating means.
Figure 2A:
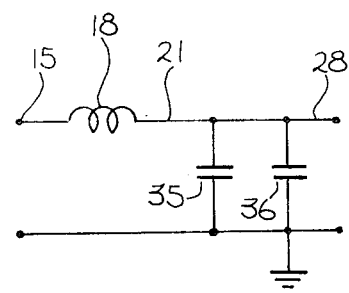
FIG. 2A is a schematic diagram of the embodiment of FIG. 2.

A second preferred embodiment of the invention is illustrated in FIG. 2. The construction of this embodiment is identical to that shown in FIG. 1, with the exception of the capacitors. The capacitors 35 and 36 of this embodiment include capacitor forming plates 37 and 39 in capacitor 35 and plates 38 and 40 in capacitor 36. The plates are of construction similar to the plates 22, 23, 24 and 25 of FIG. 1. Dielectric discs 41 and 42 are ceramic but in contrast to the discs 26 and 27 of FIG. 1, the discs of FIG. 2 are of the same material composition. The discs are, however, of different thicknesses. It will be noted from inspection of the previously given formula that capacitors formed of different thicknesses of the same dielectric material will also have different resonant frequencies.

The thicknesses are preferably chosen such that the ratio of the thicknesses of the discs is not an integral number, in fact, it is preferred that the smallest integer of which the ratio is a factor be large, for the reason previously discussed. In this way harmonics of cavity resonances of the capacitors will not coincide except at very high frequencies, beyond the highest frequency of interest. One of the capacitors, at least, will therefore have a low reactance at all frequencies within the stop band of the filter and the attenuation of the filter will remain unimpaired.

Figure 3:
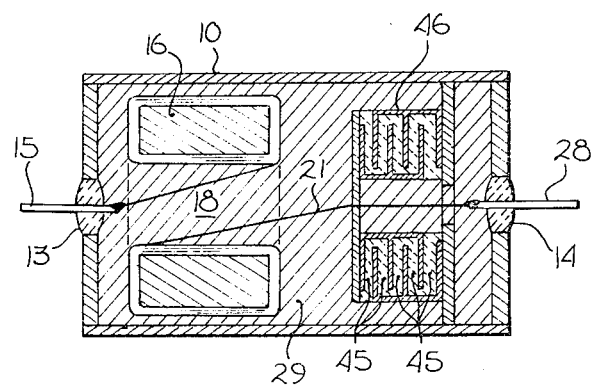
FIG. 3 is a cross-sectional view of another embodiment of the invention which utilizes different dielectric materials as the deresonating means.
Figure 3A:
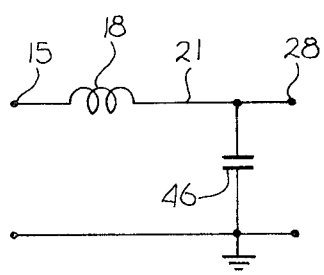
FIG. 3A is a schematic diagram of the embodiment of FIG. 3.

FIG. 3 shows a variation of FIG. 1 where the variation in dielectric materials is made within a single capacitor. Thus one or more of the dielectric discs 45 have dielectric constants different from the dielectric constants of some of the other discs. The resultant effect is the same as that described above for FIG. 1. At least one of the discs will act as a low impedance path at all frequencies within the stop band of the filter.

Figure 4:
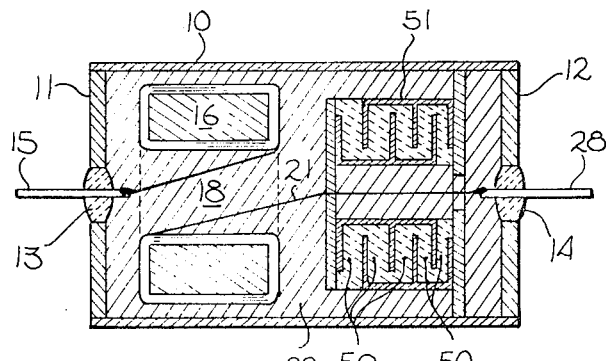
FIG. 4 is a cross-sectional view of another embodiment of the invention which utilizes different thicknesses of dielectric materials as the deresonating means.
Figure 4A:
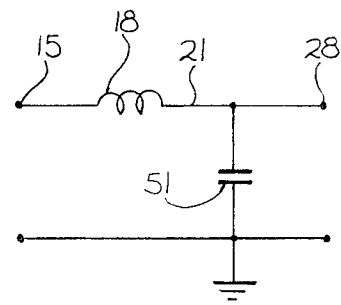
FIG. 4A is a schematic diagram of the embodiment of FIG. 4.

FIG. 4 shows a filter similar in construction to that of FIG. 3 except that dielectric discs 50 are of the same dielectric material but of varying thicknesses. The resultant effect is identical to that obtained by the construction shown in FIG. 2. The resonances of the individual capacitor sections occur at different frequencies so that at least one section is nonresonant at any given frequency thus maintaining a low reactance at all frequencies within the stop band of the filter. It will be understood that multilayer tubular capacitors such as shown in FIG. 4 of my copending application Ser. No. 730,352, may be substituted for capacitors 46 and 51 of FIGS. 3 and 4.

Figure 5:
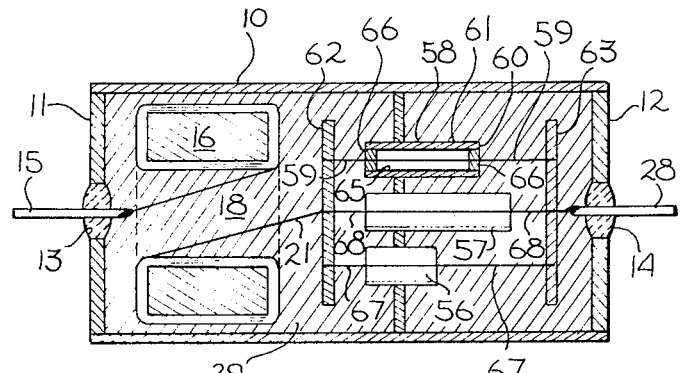
FIG. 5 is a cross-sectional view of another embodiment of the invention in which different lengths of tubular capacitors are used.
Figure 5A:
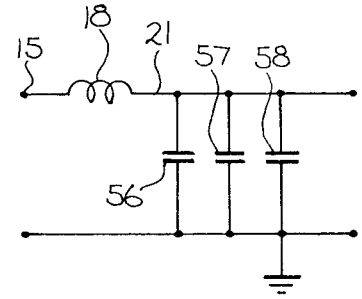
FIG. 5A is a schematic diagram of the embodiment of FIG. 5.

The embodiment of FIG. 5 utilizes a housing 10, an inductor 18, and a capacitor section which comprises a plurality of tubular capacitors 56, 57 and 58. Tubular capacitor 58, for example, consists of dielectric tube 60 having an outer conductive coating 61 and an inner conductive coating 65. Discs 66 at each end of tube 60 connect inner coating 61 to axial leads 59. The coatings 61 and 65 are the electrodes of capacitor 58. The capacitors 56 and 57 are constructed similarly to capacitor 58. Axial leads, 67, 68 and 59 of capacitors 56, 57 and 58 connect to disc 62 and disc 63. Lead 21 from inductor 18 also connects to disc 62. Output lead 28 connects to disc 63. The outer conductive coatings of each of the capacitors are connected to a ground ring 64 which in turn is in contact with the housing 10. The lengths of the capacitors 56, 57 and 58 are intentionally made to be different. Since the lengths are different, the distributed inductances of the electrodes and leads are also different. This causes the capacitors to be self-resonant at different frequencies and again at least one capacitor will not be resonant at any given frequency. It can be seen that the dielectric tubes of capacitors 56, 57 and 58 may be concentric and yet operate in the same manner as described. It may be convenient to make the tubes of the same length but vary the length of the electrode cylinders. Such construction is within the scope of the present invention.

The effect of the embodiments shown in FIGS. 1 and 2 may be achieved utilizing the construction shown in FIG. 5. If capacitors 56, 57 and 58 were of the same length but contained dielectric materials having different dielectric constants, the result would be a structure functioning the same as the structure of FIG. 1. Dielectric materials having different thicknesses would cause filter operation identical to FIG. 2.

Figure 6:
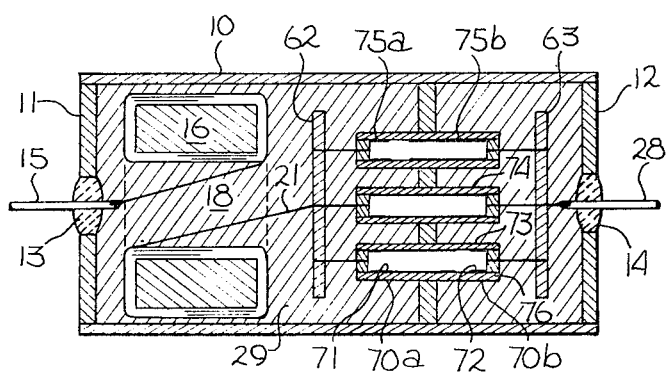
FIG. 6 is a cross-sectional view of another embodiment of the invention in which different lengths of tubular capacitors are used.
Figure 6A:
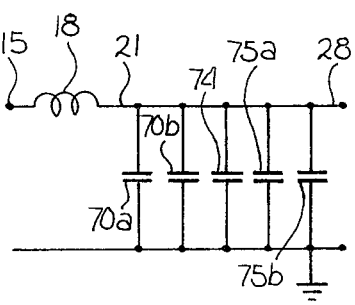
FIG. 6A is a schematic diagram of the embodiment of FIG. 6.

In FIG. 6 another method of forming parallel connected tubular capacitors is shown. In this embodiment, the inner electrodes of some of the capacitors such as capacitor 70 is broken into two parts. Capacitor 70, for example, has its inner electrode broken into parts 71 and 72. These parts are connected to conductive discs 62 and 63, respectively, as described previously. Outside coating 73 together with inner coating 71 of dielectric tube 76 form a first capacitor 70a of different length from that of a second capacitor 70b formed by the inner coating 72 and the outside coating 73 of dielectric tube 76 or from the separate capacitor 74, 75a, and 75b. Again different distributed inductances result in different self-resonant frequencies and hence at least one capacitor displaying low reactance at all frequencies within the stop band of the filter is provided.

Self-resonance of capacitors is not the only cause of loss of attenuation in filters. Due to the distributed capacitance of the winding, inductors also exhibit self-resonance effects. These can be counteracted by connecting an auxiliary inductance in series with the main inductor of the filter.

In FIG. 7 a magnetic ring core 80 surrounds the lead 21 forming a single turn inductor 81 in series with inductor 18. The core 80 may be a ferromagnetic or ferrimagnetic material and preferably has high losses. The quality factor Q, of inductor 81 is preferably less than 10 at 10 MHz. The core 80 preferably has a permeability greater than 2 at 1 MHz. Such an inductor has hardly any reduction in impedance due to resonance since the losses are high at any frequency where distributed capacity causes a resonance. Resonances of inductor 18, therefore, do not substantially reduce the impedance of the inductive arm of the filter so that attenuation is effectively maintained even when inductor 18 is resonant. Capacitor 82, connected between lead 21 and housing 10, forms the shunt arm of the filter.

More effective deresonation is obtainable if the single turn inductor is placed between sections of the main capacitor. Thus, in FIG. 8 the main capacitor is divided into two sections 85 and 86 with lead 87 connecting them. Around lead 87 is magnetic ring core 88. Core 88 has the same characteristics as the core 80 of the embodiment shown in FIG. 7 and together with lead 87 forms an inductor 89. At high frequencies where inductor 18 may resonate, the filter still retains good attenuation characteristics since it then takes the form of a pi filter comprised of capacitors 85 and 86 and inductor 89.

Still another embodiment of the present invention is illustrated in FIG. 9. Here the filter consists of a reversed L-section followed by a pi section filter. The reversed L-section consists of an inductor 18 and tubular capacitors 95, 96 and 97. The construction of tubular capacitors has been explained above in connection with the embodiment of FIG. 5. The pi section 98 may be wholly contained in a tube similar in size and shape to that of capacitors 95, 96 and 97.

In this embodiment, the input lead 15 passes through the inductor 18 connecting directly to conductive disc 99. Inductor 18 and one end of the axial leads of capacitors 95, 96 and 97 also connect to the disc 99. The other end of the axial leads of capacitors 95, 96 and 97 connect to conductive disc 100. The conductive coatings 101, 102 and 103 of capacitors 95, 96 and 97 are connected to ground ring 105 which in turn is in contact with the housing 10.

The pi filter 98, comprised of capacitors 117 and 116 and inductor 118 is shown in FIG. 9. The filter surrounds a central wire, one end of which is lead 110 connected to lead 21, and the other end of which is lead 111 which connects to lead 28. Around the central wire are two pieces of ceramic dielectric material 106 and 107 having inside conductive coatings 112 and 113. In the space between the dielectric pieces is a magnetic ring core 108 surrounding the central wire. An outside conductive coating 104 covers both pieces of dielectric material 106 and 107 and connects to the ground ring 105. It will be understood that while dielectrics 106 and 107 have been shown as two separate pieces of material, a single piece of material could be used to form the two capacitors in the manner shown for capacitors 70a and 70b in FIG. 6. End plates 114 and 115 connect inside coatings 112 and 113 to the central wires 110 and 111. The ring core 108 can be of any ferromagnetic or ferrimagnetic material as previously discussed above for core 80. Lead 28 passes through glass feed through insulator 14 and is the output lead of the filter. Between the end of pi filter 98 and the housing end plate 12, the lead 111 is shielded from fields within housing 10 by means of a metallic tube 109. Tube 109 connects at one end to the coating 104 on filter 98 and at the other end to the housing end plate 12. Tube 109 passes through a hole in conductive disc 100 without making any contact.

At high frequencies, where self-resonances as previously described may render inductor 18 or capacitors 95, 96 and 97 ineffective, the pi filter 98 will still maintain a high attenuation for the filter.

Other filter structures will be apparent from this disclosure to those skilled in the art. It should be understood that the specific configurations described in this specification are merely exemplary of the inventive concept and technique and are not to be considered as limitations of the present invention.

I claim:

1. A broadband low-pass wave filter having usable attenuation from the hundred kilohertz region up to about 20 GHz. comprising:
   a. a main multiturn inductor having given frequencies of resonance;
   b. two ceramic multilayer capacitors; and
   c. an auxiliary inductor having a single turn and being non-resonant at the given frequencies of resonance of said main multiturn inductor, said auxiliary inductor being connected so as to form a series arm of said wave filter between said two ceramic multilayer capacitors forming shunt arms of said wave filter, whereby sufficient inductive reactance in the series arms of said wave filter is maintained by the combination of said main multiturn inductor and said auxiliary single turn inductor at frequencies of resonance of said main multiturn inductor.

* * * * *